United States Patent
Hirayama et al.

(10) Patent No.: US 8,007,385 B2
(45) Date of Patent: Aug. 30, 2011

(54) SLIDING CONTACT GUIDE FOR TRANSMISSION DEVICE

(75) Inventors: Manabu Hirayama, Osaka (JP); Toyonaga Saitoh, Osaka (JP); Kaori Mori, Osaka (JP); Fumio Asami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 1704 days.

(21) Appl. No.: 11/134,885

(22) Filed: May 23, 2005

(65) Prior Publication Data

US 2006/0040774 A1    Feb. 23, 2006

(30) Foreign Application Priority Data

Aug. 19, 2004    (JP) .................. 2004-239738

(51) Int. Cl.
*F16H 7/08* (2006.01)
*F16H 7/18* (2006.01)
(52) U.S. Cl. ...................................... 474/111; 474/140

(58) Field of Classification Search .................. 474/111, 474/140
See application file for complete search history.

(56) References Cited

U.S. PATENT DOCUMENTS

| | | |
|---|---|---|
| 6,086,498 A | 7/2000 | Hashimoto |
| 6,322,471 B1 * | 11/2001 | Hashimoto ................ 474/140 |
| 2003/0064843 A1 * | 4/2003 | Konno ........................ 474/111 |
| 2003/0139236 A1 * | 7/2003 | Konno ........................ 474/111 |
| 2003/0139238 A1 * | 7/2003 | Konno et al. ................ 474/111 |

FOREIGN PATENT DOCUMENTS

JP            10-267093        10/1998

\* cited by examiner

*Primary Examiner* — Bradley T King
*Assistant Examiner* — Mahbubur Rashid
(74) *Attorney, Agent, or Firm* — Howson & Howson LLP

(57) ABSTRACT

In a sliding contact chain guide of the kind used in the timing transmission of an internal combustion engine, the back of the guide shoe, which engages a metal guide base, is formed with two, spaced longitudinal ribs, having between them a set of ribs formed in a lattice. The longitudinal ribs are wider than the ribs of the lattice.

3 Claims, 4 Drawing Sheets

SLIDING CONTACT GUIDE FOR TRANSMISSION DEVICE

FIELD OF THE INVENTION

This invention relates to a sliding contact guide for a flexible, traveling, transmission medium, used to transmit power from a driving shaft to one or more driven shafts in a transmission mechanism such as the timing drive of an internal combustion engine.

BACKGROUND OF THE INVENTION

An automobile engine generally includes a transmission device, which utilizes an endless, traveling, flexible, transmission medium, such as a roller chain, silent chain, toothed belt, or the like, to transmit rotation from the engine crankshaft to one or more valve-operating camshafts. In such a transmission device, sliding contact guides are used to guide the chain. Typically, a fixed guide is disposed in sliding engagement with the tension side of the chain, i.e., the side moving from a driven sprocket to the driving sprocket, and a movable guide is disposed in sliding engagement with the slack side of the chain, i.e., the side moving from the driving sprocket to a driven sprocket. Both guides control the path of the chain to prevent vibration, both in the plane of movement of the chain and in directions transverse to the plane of movement of the chain. The movable guide additionally cooperates with a tensioner to maintain appropriate tension in the chain. The movable guide is typically pivoted on a mounting pin extending from the engine block, and the fixed guide is typically attached to the engine block by mounting bolts. A conventional transmission device of the kind described above is depicted and explained in detail in U.S. Pat. No. 6,086,498, granted Jul. 11, 2000, the entire disclosure of which is incorporated here by reference.

Each guide usually comprises a resin shoe that is fixed to a metal guide base. The resin shoe has a guide surface on which the transmission medium slides, and a back surface which abuts the metal guide base. FIG. 4 shows the back of a typical shoe 100 of the kind used in a conventional fixed guide. The back 120 of the guide is provided with a central, longitudinal rib 140, and a plurality of perpendicular ribs 142.

In the conventional resin shoe of the kind depicted in FIG. 4, it is difficult to remove heat from the central portion of a chain-contacting surface during molding. Consequently, deformation is liable to occur as a result of thermal shrinkage and warping following molding. Another problem encountered in the molding of the conventional shoes is that the size of the finished product is difficult to control, and consequently significant size variations have been observed.

The principal object of the invention is to avoid the above-mentioned problems encountered in the manufacture and use of conventional sliding contact guides, to provide a sliding contact guide having improved strength without increasing its weight, to avoid deformation of the guide during and following molding, and to minimize size variations in the finished products.

The sliding contact guide in accordance with the invention comprises a metal guide base, and an elongated resin shoe fixed to the guide base. The shoe has a front guide surface, facing in a first direction, for sliding contact with a flexible transmission medium traveling along the direction of elongation of the shoe. The back of the shoe faces opposite to the first direction, and is disposed in abutting relationship with the guide base. The shoe also has a pair of opposite sides, and both its front guide surface and its back are situated between the sides. The back of the shoe comprises a pair of elongated first ribs extending longitudinally along the shoe in spaced relationship to each other, and a lattice composed of elongated second ribs disposed between the first ribs. The widths of the first ribs, measured in directions perpendicular to the direction in which the back of the shoe faces, are greater than the widths of the second ribs, also measured in directions perpendicular to the direction in which the back of the shoe faces.

The longitudinal first ribs preferably form parts of the pair of opposite sides of the shoe, and both the first ribs and the second ribs are preferably in contact with a front surface of the base.

The term "lattice," as used herein, refers to a configuration of ribs in which a first rib or set of generally parallel ribs is in intersecting relationship with a second rib or set of generally parallel ribs, where corresponding parts of the ribs are disposed in a common surface such as a plane or a gradually curved surface, which may be defined by a simple, two-dimensional curve, or which may be a compound curve. The respective sets of ribs of the lattice can be disposed longitudinally and transverse to the longitudinal direction of the shoe, or all the ribs can be oblique relative to the longitudinal direction of the shoe. The ribs of the two sets need not intersect one another perpendicularly.

Any of a wide variety of materials may be used to form the resin shoe. However, since the sliding contact surface of the shoe is in engagement with a moving chain or other traveling power transmission medium, the resin shoe is preferably composed of an engineering plastics such as polyamide base resins and the like, which exhibit excellent wear resistance and lubricity. Preferably materials such as nylon 6, nylon 66, aromatic group nylons, and the like are used. Fiber-reinforced plastics may be also be used, either by themselves or in combination with other materials, depending on factors such as strength requirements.

Provided that the guide has adequate heat resistance and strength, any of a wide variety of materials may be used for the metal guide base. However, iron-base metal such as cast iron, stainless steel and the like, and non-ferrous metals and metal alloys, comprising aluminum, magnesium, titanium or the like as the main component, are preferred.

The spaced, longitudinal ribs, which preferably extend along the sides of the shoe, allow uniform cooling during thermal shrinkage. The ribs of the lattice formed between the longitudinal ribs ensure that the guide has adequate strength to serve as a sliding contact guide for a travelling transmission medium. Moreover, since the widths of the longitudinal ribs are greater than the widths of the lattice ribs, deformation of the shoe due to thermal shrinkage following molding is suppressed.

Suppression of thermal shrinkage after molding affords a greater degree of freedom in the design of the shoe, and reduces the size variation of the finished product so that consistent high quality can be achieved. Suppression of thermal shrinkage of the shoe also reduces deformation of the sliding contact surface, so that a chain or other traveling transmission medium can run over the shoe in a stable manner with a minimum of wear. As a result, the service life of the shoe is extended.

DETAILED DESCRIPTION OF THE PREFERRED EMBODIMENT

Figure 1:
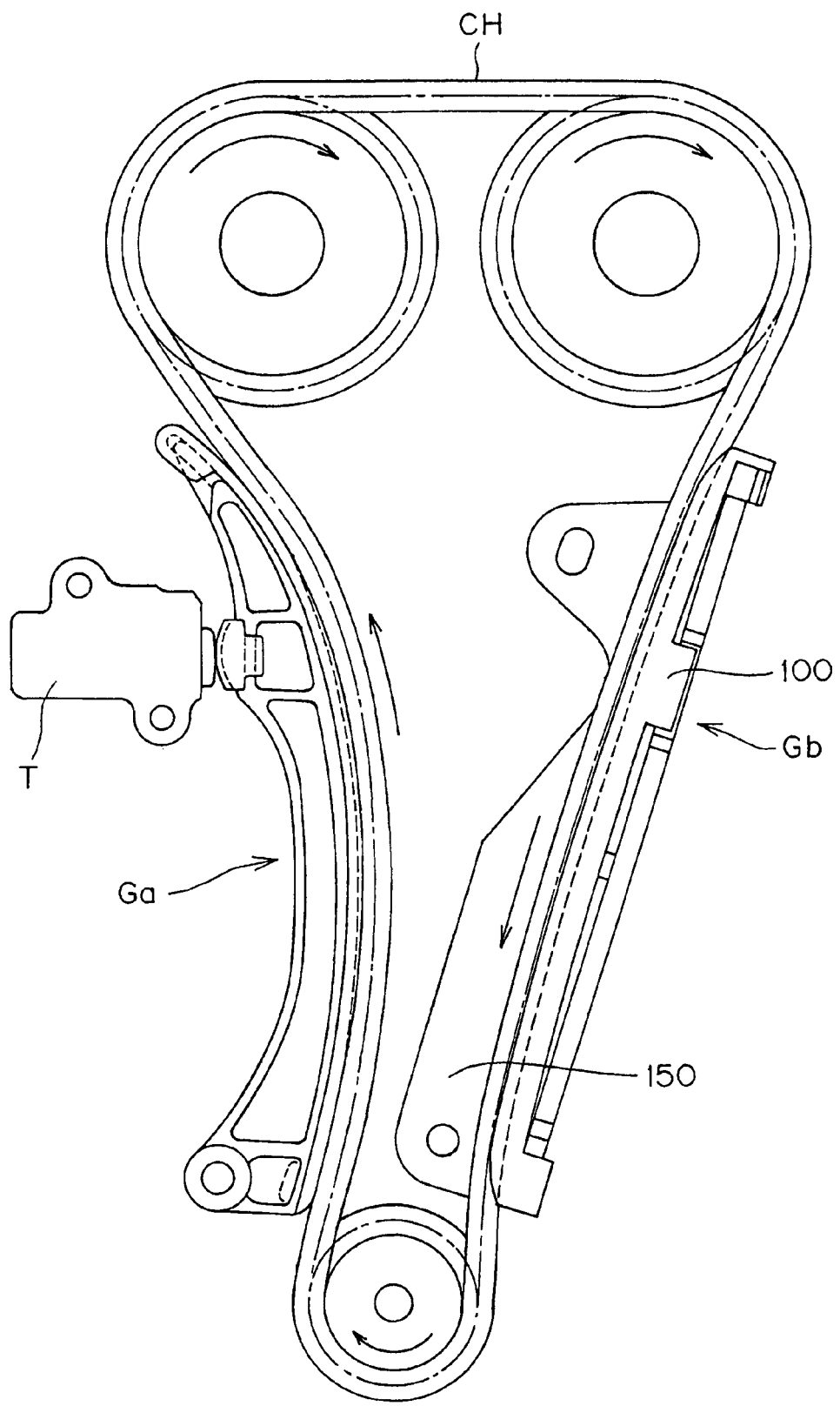
FIG. 1 is a schematic elevational view of the timing transmission of a dual overhead cam internal combustion engine equipped with a sliding contact guide in accordance with the invention.

In the transmission shown in FIG. 1, a movable guide Ga and a fixed guide Gb, are provided respectively on the slack and tension sides of a drive chain CH arranged to be driven by a crankshaft sprocket and to drive two camshaft sprockets. The movable guide is pivoted, and urged by a tensioner T into sliding contact with the chain.

Figure 2:
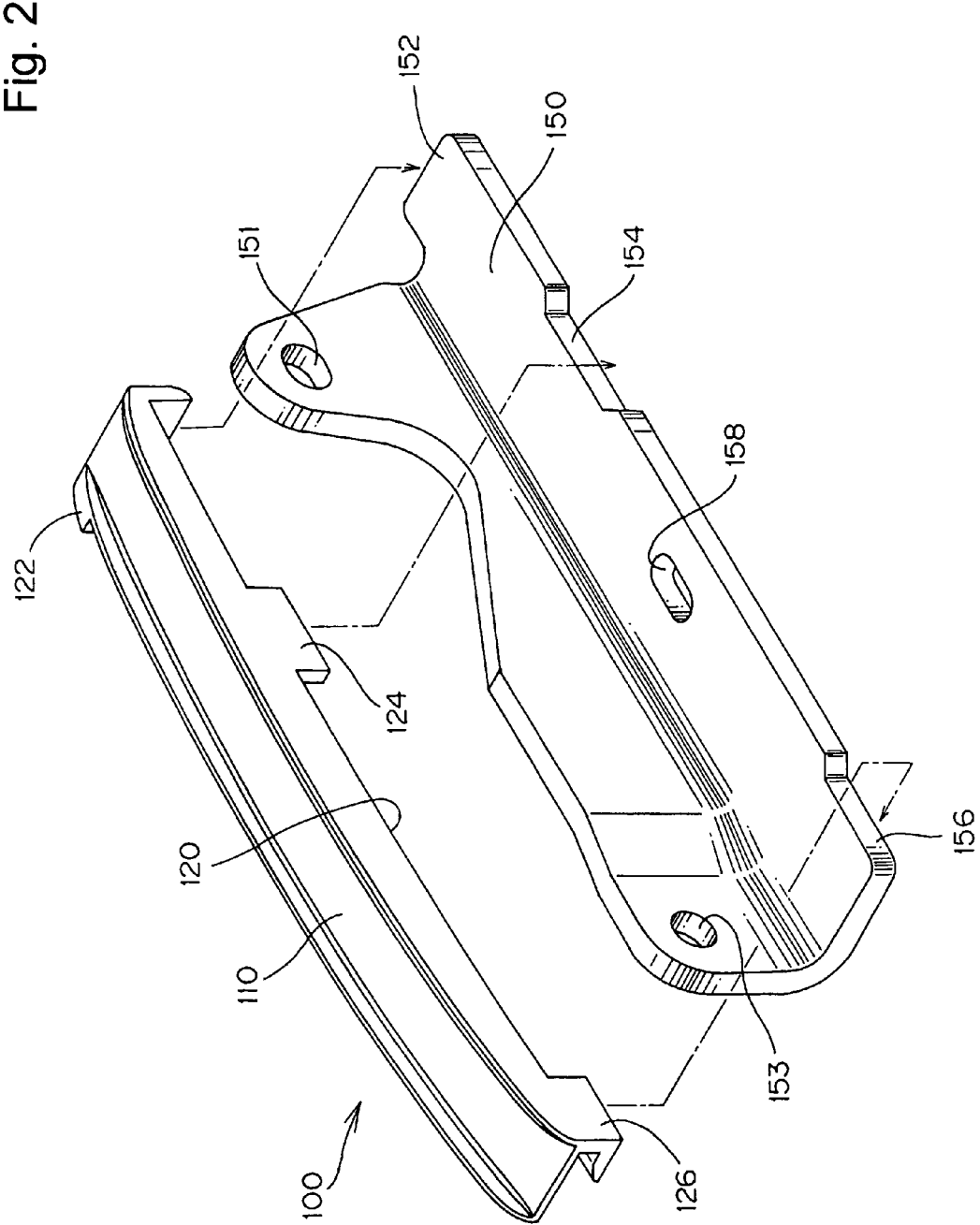
FIG. 2 is an exploded perspective view showing the shoe and guide base of the fixed guide shown in FIG. 1.

The movable guide Ga and the fixed guide Gb are similar, differing from each other primarily only in their shapes and in the methods by which they are attached to the engine block. The characterizing features of the invention reside in the structure of the backs of resin shoes of the guides, and will be described with reference to the fixed guide Gb. It should be understood, however, that the invention is applicable to movable guides as well as to fixed guides As shown in FIG. 2, a metal guide base 150 is provided with a flange having mounting holes 151 and 153 for receiving bolts by which the base can be secured to an engine block.

Figure 3:
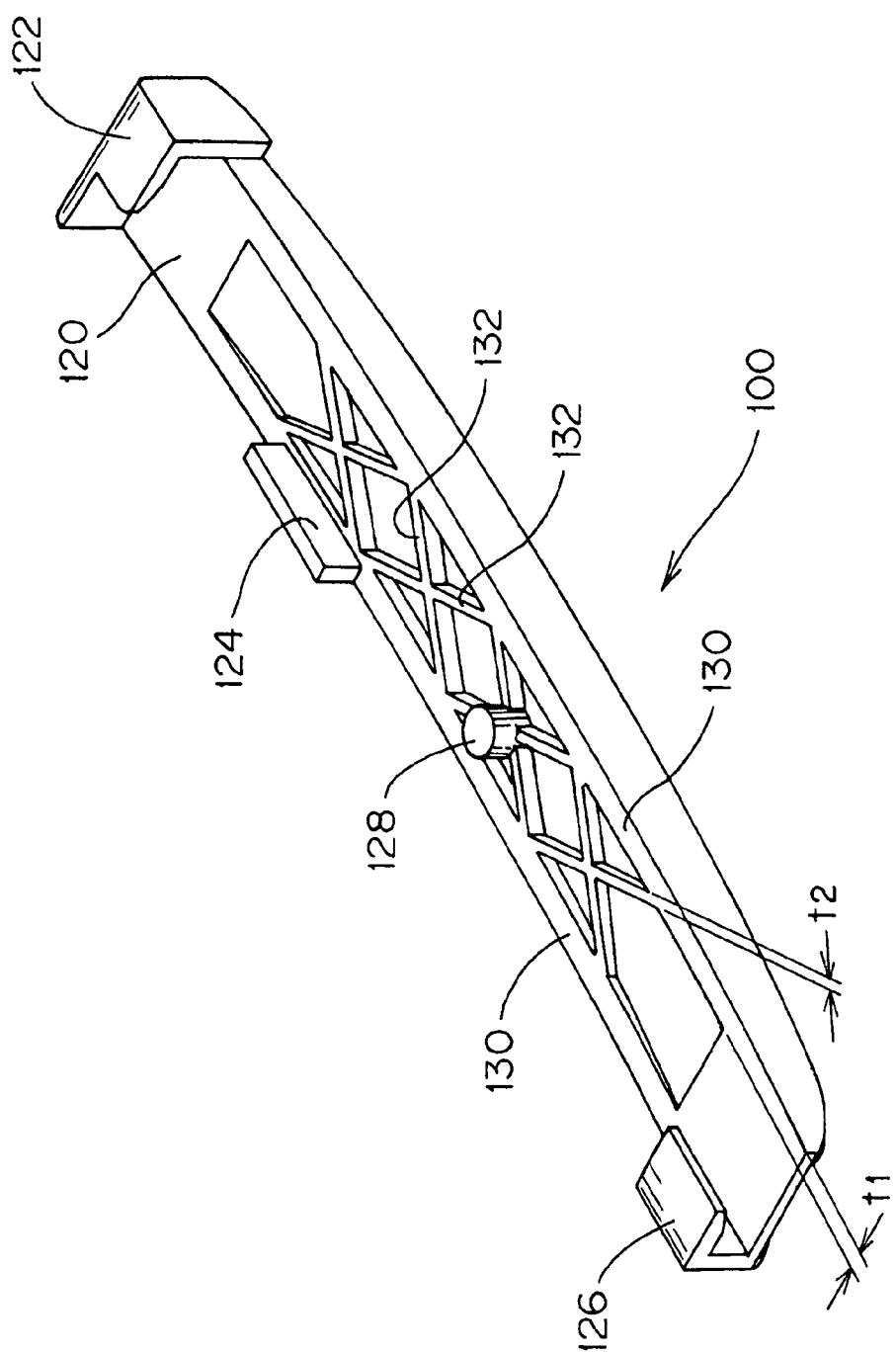
FIG. 3 is a perspective view showing the back of the shoe of FIG. 2.
Figure 4:
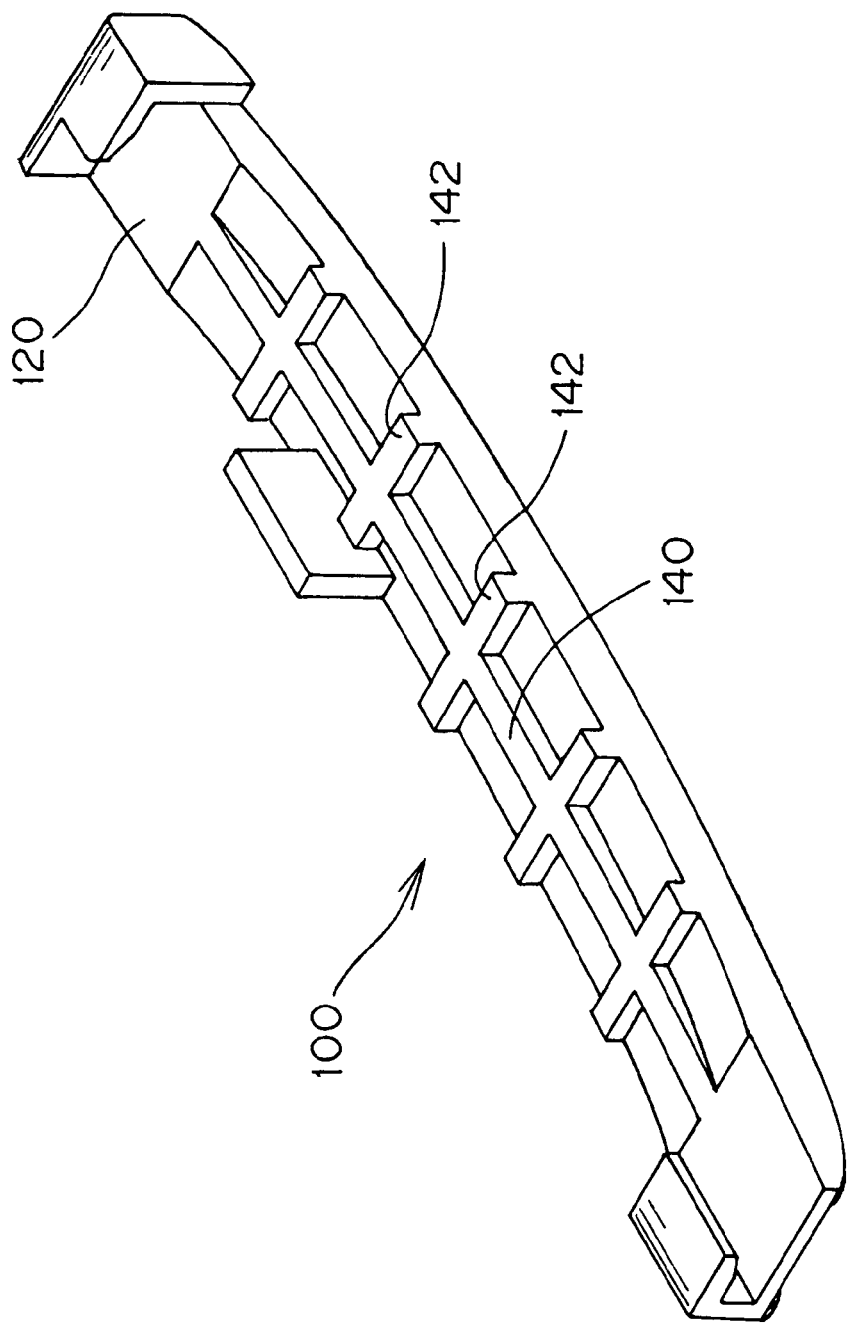
FIG. 4 is a perspective view, corresponding to FIG. 3, but showing the back of the shoe of a conventional fixed guide.

Resin shoe 100 is elongated, and has an elongated guide surface 110 on which a chain can slide, and a back 120 for engagement with the guide base. The shoe has a leading end engagement tab 122, a rear end engagement tab 126, and a side engagement tab 124, which respectively attach to a leading end 152, a rear recess 156, and a side recess 154 on the guide base. The guide base also has a longitudinally elongated, central locating hole 158 for receiving a circular post 128 formed on the back of the resin guide, as shown in FIG. 3. Engagement of the post with the locating hole restricts lateral movement of the shoe 100.

Two longitudinal ribs 130 are formed on the back of the shoe 120. These ribs are spaced laterally from each other, and, in the embodiment shown, extend along the sides of the shoe, forming parts of the outermost parts of the side walls of the shoe. A second set of ribs 132 is arranged in a lattice between ribs 130. Column 128 is formed at one of the intersections of the ribs of the lattice. The heights of the ribs are preferably the same, so that all of the ribs can simultaneously engage the front surface of the guide base 150, which is preferably, although not necessarily, planar.

The width t1 of each of the longitudinal ribs 130 is measured in a direction which is perpendicular to the direction in which the back of the shoe faces and also perpendicular to the length of the rib. The width t2 of the ribs 132 is measured in a direction perpendicular to the direction in which the back of the shoe faces and also perpendicular to the length of the rib. The ribs 130 preferably have the same, uniform, width t1, and the ribs 132 preferably have the same, uniform, width t2. Width t1 is greater than width t2, and, because of this difference in widths, thermal shrinkage following molding of the shoe is suppressed.

In a case in which the widths of the ribs 130 are different or non-uniform, a case in which the widths of ribs 132 are different or non-uniform, or in the case in which the widths of ribs 130, as well as the widths of ribs 132, are different or non-uniform, the narrowest part of the narrower longitudinal rib 130 in the shoe should be wider than the widest part of any of the lattice ribs 132 in the shoe.

The narrow ribs of the shoe can be disposed in any of a wide variety of lattice configurations. Preferably, however, a lattice as shown in FIG. 3 is used, where the narrow ribs are in oblique relation to the longitudinal ribs, and the sets of narrow ribs intersect nearly perpendicularly.

We claim:

1. A sliding contact guide comprising a metal guide base, and an elongated resin shoe fixed to said guide base, said shoe having a front guide surface, facing in a first direction, for sliding contact with a flexible transmission medium traveling along the direction of elongation of the shoe, a back facing in a second direction opposite to said first direction, in abutting relationship with said guide base, and a pair of opposite sides, the front guide surface and the back both being situated between said opposite sides, wherein said back comprises a back surface opposite from said front guide surface and facing in said second direction, a pair of first ribs protruding from said back surface in said second direction, each of said first ribs being elongated in a direction substantially perpendicular to said first and second directions and said first ribs extending, along their directions of elongation, longitudinally along the shoe in spaced relationship to each other, and a lattice composed of second ribs disposed between the first ribs, each of said second ribs also being elongated in a direction substantially perpendicular to said first and second directions, and protruding from said back surface in said second direction, and the width of each of the first ribs, measured in a direction substantially perpendicular to said second direction and to the direction of its elongation, being greater than the widths width of each of said second ribs, also measured in a direction substantially perpendicular to said second direction and to its direction of elongation.

2. A sliding contact guide according to claim 1, in which said elongated first ribs form parts of said pair of opposite sides of the shoe.

3. A sliding contact guide according to claim 1, in which said guide base has a front surface, and said first ribs and said second ribs are in contact with said front surface of the base.

\* \* \* \* \*